(12) United States Patent
Coughlin

(10) Patent No.: US 11,972,397 B1
(45) Date of Patent: Apr. 30, 2024

(54) AI-BASED EMPLOYMENT SOCIAL NETWORK EXTENDER

(71) Applicant: Align Consulting Group LLC, Fort Washington, PA (US)

(72) Inventor: Ryan Coughlin, Fort Washington, PA (US)

(73) Assignee: ALIGN CONSULTING GROUP LLC, Fort Washington, PA (US)

(*) Notice: Subject to any disclaimer, the term of this patent is extended or adjusted under 35 U.S.C. 154(b) by 0 days.

(21) Appl. No.: 18/365,960

(22) Filed: Aug. 4, 2023

(51) Int. Cl.
  *G06Q 10/1053* (2023.01)
  *G06N 5/022* (2023.01)
  *G06Q 50/00* (2012.01)

(52) U.S. Cl.
  CPC ......... *G06Q 10/1053* (2013.01); *G06N 5/022* (2013.01); *G06Q 50/01* (2013.01)

(58) Field of Classification Search
  None
  See application file for complete search history.

(56) References Cited

U.S. PATENT DOCUMENTS

| | | | |
|---|---|---|---|
| 2014/0122355 A1* | 5/2014 | Hardtke | G06Q 10/1053 705/321 |
| 2016/0092837 A1 | 3/2016 | Panigrahi et al. | |
| 2017/0004450 A1 | 1/2017 | Rathod et al. | |
| 2017/0061382 A1* | 3/2017 | Zhang | G06Q 10/1053 |
| 2018/0225633 A1 | 8/2018 | Kenthapadi et al. | |
| 2018/0308062 A1* | 10/2018 | Quitmeyer | G06Q 10/1053 |
| 2019/0114593 A1* | 4/2019 | Champaneria | G06F 16/3326 |
| 2020/0394615 A1* | 12/2020 | Sethre | G06N 5/02 |
| 2022/0067665 A1* | 3/2022 | Westerheide | G06N 20/00 |

OTHER PUBLICATIONS

N. Jayakumar, A. K. Maheshwaran, P. S. Arvind and G. Vijayaragavan, "On-Demand Job-Based Recruitment for Organisations Using Artificial Intelligence," 2023 International Conference on Networking and Communications (ICNWC), Chennai, India, 2023, pp. 1-6, doi: 10.1109/ICNWC57852.2023.10127551. (Year: 2023).*

(Continued)

*Primary Examiner* — Laura Yesildag
(74) *Attorney, Agent, or Firm* — Galvin Patent Law LLC; Brian R. Galvin

(57) ABSTRACT

An artificial-intelligence-directed social network extender for existing employees and recruiters which increases the pool of available candidates for an employer while also maximizing the effectiveness of candidate selection. In an embodiment, a recruiting manager extends the social networks of employees and recruiters to maximize the available pool of candidates for a given job opening. A first machine learning algorithm provides instructions to a crawler to gather both candidate information from the extended social network, plus corporate structure information from the Internet for privacy and conflict checking purposes. The gathered information is stored in a knowledge graph which is analyzed by a second machine learning algorithm to identify candidates and relationships most likely to produce a good fit for the job opening.

4 Claims, 11 Drawing Sheets

(56) References Cited

OTHER PUBLICATIONS

V. S. Pendyala, N. Atrey, et al. "Enhanced Algorithmic Job Matching based on a Comprehensive Candidate Profile using NLP and Machine Learning," 2022 IEEE Eighth International Conference on Big Data Computing Service and Applications (BigDataService), Newark, CA, USA, 2022, pp. 183-218 (Year: 2022).*

Gusain, T. Singh, S. Pandey et. al. "E-Recruitment using Artificial Intelligence as Preventive Measures," 2023 International Conference on Sustainable Computing and Data Communication Systems (ICSCDS), Erode, India, 2023, pp. 516-522, doi: 10.1109/ICSCDS56580.2023.10105102 (Year: 2023).*

Mankawade, V. Pungliya, R. Bhonsle, S. Pate, A. Purohit and A. Raut, "Resume Analysis and Job Recommendation," 2023 IEEE 8th International Conference for Convergence in Technology (I2CT), Lonavla, India, 2023, pp. 1-5, doi: 10.1109/I2CT57861.2023.10126171. (Year: 2023).*

V. Pendyala, N. Atrey, et al. "Artificial Intelligence Enabled, Social Media Leveraging Job Matching System for Employers and Applicants," 2022 International Conf. on Recent Trends in Microelectronics, Automation, Computing and Communications Systems (ICMACC), Hyderabad, India, 2022, pp. 422-429. (Year: 2022).*

I. Tewari and M. Pant, "Artificial Intelligence Reshaping Human Resource Management : A Review," 2020 IEEE International Conference on Advent Trends in Multidisciplinary Research and Innovation (ICATMRI), Buldhana, India, 2020, pp. 1-4, doi: 10.1109/ICATMRI51801.2020.9398420. (Year: 2020).*

\* cited by examiner

AI-BASED EMPLOYMENT SOCIAL NETWORK EXTENDER

CROSS-REFERENCE TO RELATED APPLICATIONS

Priority is claimed in the application data sheet to the following patents or patent applications, each of which is expressly incorporated herein by reference in its entirety:
None

BACKGROUND OF THE INVENTION

Field of the Art

The present invention is in the field of computer-based decision-making systems, and more particularly in the field of artificial-intelligence-directed social network extension for employment recruiting.

Discussion of the State of the Art

One of the never-ending challenges for employers is to find qualified employee candidates to fill available job openings. One commonly used process for finding qualified candidates is posting of job openings on employment websites, which websites then search databases of persons who have submitted their resumes to the website to find matches with the requirements of the job openings. Another commonly used process for finding qualified candidates is sending job openings to recruiters, who search their own databases of persons who have submitted their resumes to the recruiter to find matches with the requirements of the job openings. Both processes have substantial drawbacks in that their searches for qualified candidates are limited to private databases of people who have taken the active step of submitting their resumes. This substantially limits the number of potential candidates. While some employers post job openings on internal message boards, responses by existing employees are ad-hoc and may or may not produce any useful results.

What is needed is a means for leveraging the social networks of both existing employees and recruiters using artificial-intelligence-directed social network extension to increase the pool of available candidates while also maximizing the effectiveness of candidate selection.

SUMMARY OF THE INVENTION

Accordingly, the inventor has conceived and reduced to practice, an artificial-intelligence-directed social network extender for existing employees and recruiters which increases the pool of available candidates for an employer while also maximizing the effectiveness of candidate selection. In an embodiment, a recruiting manager extends the social networks of employees and recruiters to maximize the available pool of candidates for a given job opening. A first machine learning algorithm provides instructions to a crawler to gather both candidate information from the extended social network, plus corporate structure information from the Internet for privacy and conflict checking purposes. The gathered information is stored in a knowledge graph which is analyzed by a second machine learning algorithm to identify candidates and relationships most likely to produce a good fit for the job opening.

According to a preferred embodiment, a system for social network extension for recruiting for job openings is disclosed, comprising: a computing device comprising a memory and a processor; a first machine learning algorithm operating on the computing device, the first machine learning algorithm having been trained to identify information on social media networks and databases relevant to job openings; a second machine learning algorithm operating on the computing device, the second machine learning algorithm having been trained to generate a knowledge graph comprising information relevant to selection of candidates for job openings; a third machine learning algorithm operating on the computing device, the third machine learning algorithm having been trained to analyze the knowledge graph to identify a best fit between job openings and candidates for job openings; a recruitment manager comprising a first plurality of programming instructions stored in the memory which, when operating on the processor, causes the computing device to: receive a job opening from an employer, the job opening comprising job requirements; send the job opening to an artificial-intelligence-directed (AI-directed) data scraper; receive candidate information from the AI-directed data scraper relevant to the job opening; send the job opening and candidate information to an artificial-intelligence-based (AI-based) knowledge graph generator; request a candidate selection from an artificial-intelligence-based (AI-based) graph analyzer; receive the candidate selection and send it to the employer; the AI-directed data scraper comprising a second plurality of programming instructions stored in the memory which, when operating on the processor, causes the computing device to: receive the job opening; process the job requirements of the job opening through the first machine learning algorithm to obtain scraping instructions; scrape candidate data for one or more candidates from one or more employment-related social networks of an employee or of an external recruiter according to the scraping instructions; and return the candidate information to the recruiting manager; the AI-based knowledge graph generator comprising a third plurality of programming instructions stored in the memory which, when operating on the processor, causes the computing device to: receive the job opening and candidate information; and process the job opening and candidate information through the second machine learning algorithm to generate a knowledge graph comprising nodes representing data components comprising the job requirements and the candidate information, and edges representing relationships between the data components; and the AI-based knowledge graph analyzer comprising a fourth plurality of programming instructions stored in the memory which, when operating on the processor, causes the computing device to: receive the request for the candidate selection; and process the request through the third machine learning algorithm to make the candidate selection; and return the candidate selection to the recruitment manager.

According to another preferred embodiment, a method for social network extension for recruiting for job openings is disclosed, comprising the steps of: training a first machine learning algorithm operating on a computing device comprising a memory and a processor to identify information on social media networks and databases relevant to job openings; training a second machine learning algorithm operating on the computing device to generate a knowledge graph comprising information relevant to selection of candidates for job openings; training a third machine learning algorithm operating on the computing device to analyze the knowledge graph to identify a best fit between job openings and candidates for job openings; using a recruitment manager operating on the computing device to: receive a job opening from an employer, the job opening comprising job requirements; send the job opening to an artificial-intelligence-directed (AI-directed) data scraper; receive candidate information from the AI-directed data scraper relevant to the job opening; send the job opening and candidate information to an artificial-intelligence-based (AI-based) knowledge graph generator; request a candidate selection from an artificial-intelligence-based (AI-based) graph analyzer; receive the candidate selection and send it to the employer; using the AI-directed data scraper operating on the computing device to: receive the job opening; process the job requirements of the job opening through the first machine learning algorithm to obtain scraping instructions; scrape candidate data for one or more candidates from one or more employment-related social networks of an employee or of an external recruiter according to the scraping instructions; and return the candidate information to the recruiting manager; using the AI-based knowledge graph generator operating on the computing device to: receive the job opening and candidate information; and process the job opening and candidate information through the second machine learning algorithm to generate a knowledge graph comprising nodes representing data components comprising the job requirements and the candidate information, and edges representing relationships between the data components; and using the AI-based knowledge graph analyzer operating on the computing device to: receive the request for the candidate selection; and process the request through the third machine learning algorithm to make the candidate selection; and return the candidate selection to the recruitment manager.

According to an aspect of an embodiment, the job opening further comprises company information; and the AI-directed data scraper is further configured to: process the job requirements of the job opening through the first machine learning algorithm to obtain scraping instructions; and scrape company information from one or more corporate information databases according to the scraping instructions.

According to an aspect of an embodiment, a privacy violation and conflict checking engine is used to: determine whether any conflicts of interest exist between and among the employer, the employee, the recruiter, and the one or more candidates; and mask sensitive information of the one or more candidates from the employer.

According to an aspect of an embodiment, the recruiting manager first limits the AI-directed data scraper to operate only on social networks of employees of the employer and then, after a pre-defined period of time, instructs the AI-directed data scraper to operate only on social networks of external recruiters.

According to an aspect of an embodiment, a recruiter to recruiter marketplace is used to, after the pre-defined period of time: identify situations wherein the candidate selection is a candidate found as a connection of a first recruiter, but who is a client of, or under contract to, a second recruiter; send an offer to the second recruiter to split a recruiting fee for the candidate selection with the first recruiter, the offer comprising a split percentage or a split amount; receive an acceptance of the offer from the second recruiter; and upon acceptance by the employer of the candidate selection for the job opening, send portions of the recruiting fee to the first recruiter and second recruiter according to the split percentage or split amount.

BRIEF DESCRIPTION OF THE DRAWING FIGURES

DETAILED DESCRIPTION OF THE INVENTION

Figure 1:
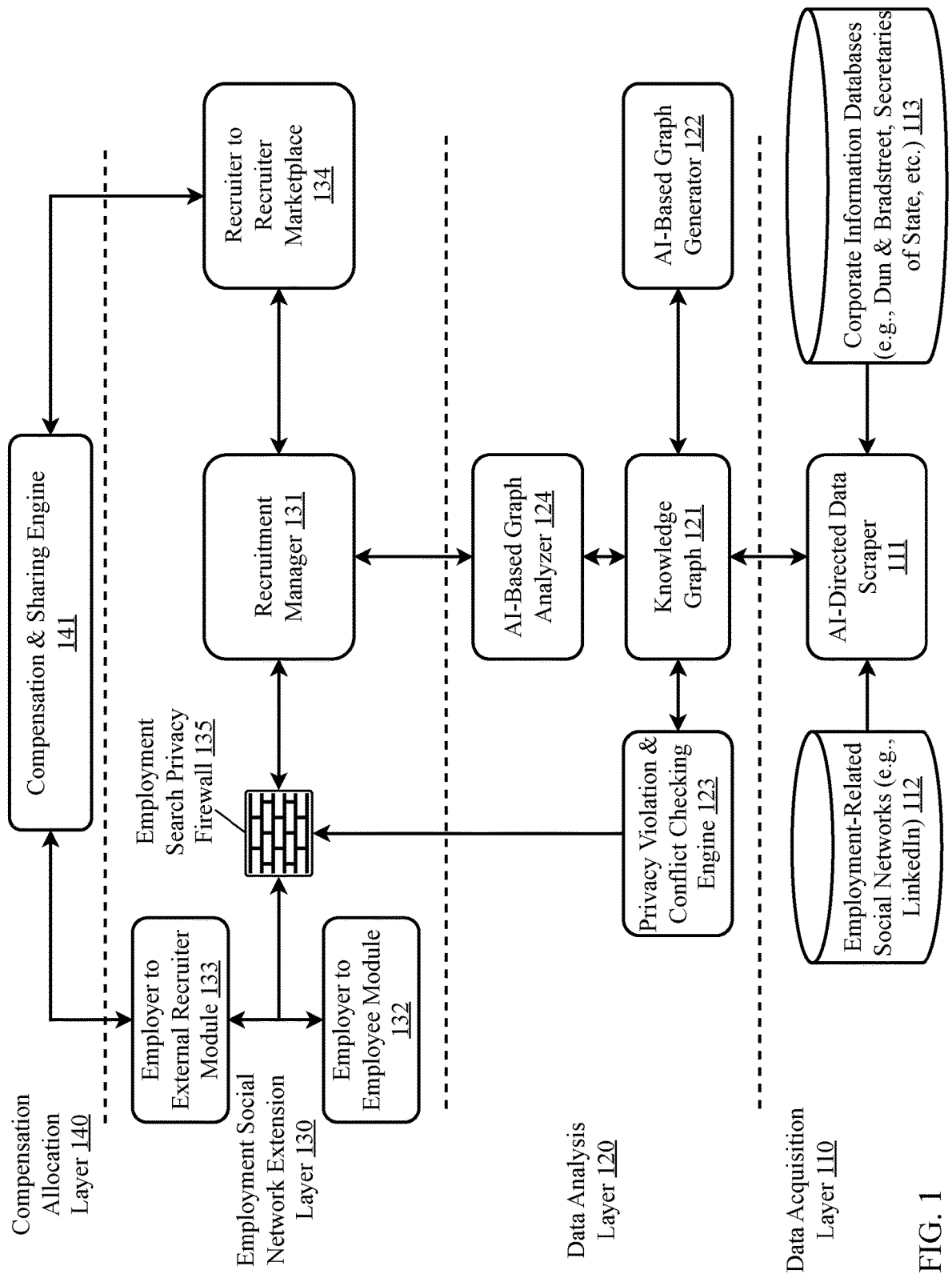
FIG. 1 is a block diagram illustrating an exemplary system architecture for a system for AI-based employment social network extension.

The inventor has conceived, and reduced to practice, an artificial-intelligence-directed social network extender for existing employees and recruiters which increases the pool of available candidates for an employer while also maximizing the effectiveness of candidate selection. In an embodiment, a recruiting manager extends the social networks of employees and recruiters to maximize the available pool of candidates for a given job opening. A first machine learning algorithm provides instructions to a crawler to gather both candidate information from the extended social network, plus corporate structure information from the Internet for privacy and conflict checking purposes. The gathered information is stored in a knowledge graph which is analyzed by a second machine learning algorithm to identify candidates and relationships most likely to produce a good fit for the job opening.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture for a system for AI-based employment social network extension. In this exemplary system architecture, a system for AI-based employment social network extension can be conceived as comprising four layers, a data acquisition layer 110, a data analysis layer 120, a social network extension layer 130, and a compensation allocation layer 140.

Data acquisition layer 110 comprises an artificial-intelligence-directed (AI-directed) data scraper 111 configured to take direction from an AI-based social network manager 131 to gather information about candidates for a particular job opening from employment-related social networks 112 such as LinkedIn, as well as information about companies from corporate information databases 113 such as Dun & Bradstreets, OpenCorporates, the U.S. Securities and Exchange Commission, and the Secretaries of State of various states or jurisdictions. The candidate information gathered from employment-related social networks 112 provides information about the education, skills, licensing, qualifications, and suitability of candidates for a given job opening. The corporate information gathered from corporate information databases 113 provides information about corporate structure and relationships, which is used to provide privacy protections to potential candidates and to determine whether any conflicts of interest exist between and among employers, employees, candidates, and recruiters. For example, a job-seeking candidate working for Company A will not want his boss or the human resources department at Company A to know that he is seeking work elsewhere. Company A may be a subsidiary or affiliate of Company B and both companies may use a common recruiter or job-seeking platform. Using corporate structure information available from corporate information databases 113, knowledge of the candidate's job-seeking elsewhere may be shielded (e.g., via employment search privacy firewall 135) not only from Company A, but also Company B, and possible from the common recruiter or job-seeking platforms used by both companies. As another example, recruiter A and recruiter B may both have separate, non-exclusive contracts with candidate C for recruitment as well as having agreed to the terms of an external recruitment contract for a particular job opening with company D. If recruiter A and recruiter B both submit candidate C to company D, employment search privacy firewall 135 may flag a potential conflict for resolution by the human resources department of company D, wherein the human resources department must determine whether the fee for candidate C is payable to recruiter A only, recruiter B only, or subject to a fee-sharing arrangement as set forth in the external recruitment contract.

Data analysis layer 120 comprises a knowledge graph 121 created from all information gathered by AI-directed data scraper 111 as well as information obtained from employment social network extension layer 130. Knowledge graph 121 represents all information gathered as a complex web of nodes and edges, wherein the nodes of represent data components (entities, objects, events, situations, and concepts), and the edges between the nodess represent relationships between the data components. Edges of knowledge graph 121 are usually directed (i.e., having direction, as in a directed graph) and may be labeled or weighted to represent a type or strength of relationship. Knowledge graphs 121 is generated and analyzed by an AI-based graph generator 122, which is a machine learning algorithm that has been trained to identify types of nodes and classify complex relationships between the nodes, thus placing the nodes within a schematic context and drawing edges between the nodes representing relationships among them that have been determined by the machine learning algorithm through its training. AI-based graph generator 122 classifies information received for knowledge graph 121 and adds appropriate nodes and edges for the information to knowledge graph 121 based on the schematic context of the information as determined by its machine learning algorithm. Queries may be sent to AI-based graph generator 122 for generation of a relevant response based on the information contained in knowledge graph 121. For example, a job opening with its requirements may be fed into AI-based graph generator 122, which will search knowledge graph 121 for a suitable candidate based on all information available such as candidate qualifications, location, relationships with employers, employees, and other candidates, and other information gathered as described above.

Social network extension layer 130 handles relationships among employers, employees, recruiters, and the various social networks in which each of them participates. Social network extension layer 130 comprises recruitment manager 131, and employer to employee module 132, an employer to external recruiter module 133, a recruiter to recruiter marketplace 134 and an employment search privacy firewall 135.

Recruitment manager 131 coordinates the engagement and interactions between employers, employees, and recruiters, directs AI-directed data scraper to gather information from employment-related social networks and corporate information databases, manages transfer of recruiting contracts from an internal search via employee networks to an external search via recruiters at a time determined by employer when each recruiting contract is set up for each job opening, tracks submission of candidate applications for job openings, and makes payments for candidates accepted for job openings.

Employer to employee module 132 provides employers with an interface for setting up an employer company account including, but not limited to, establishing of rules for employee participation in internal recruiting efforts of the employer, description of the company's corporate structure (e.g., for internal allocation of job postings among subsidiaries or corporate affiliates), and sending invitations to employees to participate in internal recruiting efforts. Employer to employee module 132 further provides employers with an interface for setting up recruiting contracts for available job openings (or groups of job openings) including, but not limited to, establishment of rules for a given job opening, establishment of fees to be paid for fulfillment of a given job opening establishment of disqualifiers for participation or receipt of fees (e.g., fraud, acting as an external recruiter by soliciting candidates from outside of the employee's social networks, etc.), and establishment of a timeline for transfer of the internal recruitment effort using employee networks to an external recruitment effort using recruiters. Employer to employee module 132 further provides employers with an interface for establishment of job requirements for job openings including, but not limited to, candidate criteria, recruiting fees, fee kickers and additional incentives, eligible employee criteria, timelines or deadlines for employees to accept participation in a given job opening, disqualifiers, and a timeline or deadline for transfer of the internal recruitment effort using employee networks to an external recruitment effort using recruiters employer to external recruiter module 133.

Employer to employee module 132 provides employees wishing to participate in internal recruitment efforts an interface for granting the AI-directed data scraper 111 access to their social network profiles for gathering of information about potential candidates (including, but not limited to, first degree of separation connections ($1^{st}$ DOSCs)). Employer to employee module 132 further provides participating employees an interface for dashboards for managing their internal recruitment participation including, but no limited to, providing information about available job openings, fees available, fees paid, lists of their first degree of separation connections ($1^{st}$ DOSCs) eligible for certain job openings, strikes remaining (i.e., rule violations or other participation failures associated with an employee's participation in internal recruiting efforts including, but not limited to, instances in which an accepted candidate is fired or rejected within a defined trial or probationary period), and the time remaining until a given job opening is transferred from an internal recruitment effort using employee networks to an external recruitment effort using recruiters.

Employer to external recruiter module 133 provides employers with an interface for setting up an employer company account including, but not limited to, establishing of rules for recruiter participation in external recruiting efforts of the employer, description of the company's corporate structure (e.g., for external allocation of job postings among subsidiaries or corporate affiliates), and sending invitations to recruiters to participate in external recruiting efforts. Employer to external recruiter module 133 further provides employers with an interface for setting up recruiting contracts for available job openings (or groups of job openings) including, but not limited to, establishment of rules for a given job opening, establishment of fees to be paid for fulfillment of a given job opening establishment of disqualifiers for participation or receipt of fees (e.g., fraud, unauthorized fee sharing with recruiters who have not accepted the terms of participation in the employer's external recruiting process, etc.), and establishment of a timeline for transfer of the internal recruitment effort using employee networks to an external recruitment effort using recruiters. Employer to external recruiter module 133 further provides employers with an interface for establishment of job requirements for job openings including, but not limited to, candidate criteria, recruiting fees, fee kickers and additional incentives, eligible recruiter criteria, timelines or deadlines for recruiters to accept participation in a given job opening, disqualifiers, and a timeline or deadline for transfer of the internal recruitment effort using employee networks to an external recruitment effort using recruiters employer to external recruiter module 133.

Employer to external recruiter module 133 provides recruiters wishing to participate in external recruitment efforts an interface for granting the AI-directed data scraper 111 access to their social network profiles for gathering of information about potential candidates (including, but not limited to, first degree of separation connections ($1^{st}$ DOSCs)). Employer to external recruiter module 133 further provides participating recruiters an interface for dashboards for managing their external recruitment participation including, but no limited to, providing information about available job openings, fees available, fees paid, lists of their first degree of separation connections ($1^{st}$ DOSCs) eligible for certain job openings, strikes remaining (i.e., rule violations or other participation failures associated with an recruiter's participation in external recruiting efforts including, but not limited to, instances in which an accepted candidate is fired or rejected within a defined trial or probationary period), lists of candidates submitted for consideration who are in process for evaluation by employer, a current rating of the recruiter by the employer (or vice-versa), a copy of the recruiter's resume and/or history of placements, and a list of recruiter to recruiter links through potential candidates identified through each recruiter's extended social network.

Recruiter to recruiter marketplace 134 tracks each recruiter's links to other recruiters through potential candidates identified through each recruiter's extended social network, and makes connections among and between recruiters based on those links. Recruiter to recruiter marketplace uses these recruiter to recruiter links and/or connections to perform fee-splitting between or among recruiters. As one example of a fee-splitting or fee-sharing arrangement that could be implemented, assume that a recruiter A has a contract with candidate B, but no contacts with or knowledge of positions available at company C. Recruiter D often works with company C and has knowledge of a job opening for which candidate B might be suitable. AI-based social network extender 200 discovers that recruiter D has certain connections to candidate B through his extended social networks. Recruitment manager 131 may send an offer to recruiter A to share fees with recruiter D for a job opening for which candidate B may be suitable. If recruiter A accepts the offer, then candidate B will be sent to company C as a candidate for the open job position. If company C accepts candidate B, then compensation & sharing engine 141 receives the total fee for the filled job opening from company C and splits the fee between recruiter A and recruiter D according to the terms of the offer.

Employment search privacy firewall 135 provide privacy protections to potential candidates and avoids conflicts of interest between and among employers, employees, candidates, and recruiters, by shielding sensitive information as directed by privacy violation and conflict checking engine 123 based on analyses of knowledge graph 121 by AI-based graph generator 122. As one example, the corporate information gathered from corporate information databases 113 provides information about corporate structure and relationships, which is used to provide privacy protections to potential candidates by masking sensitive information and to determine whether any conflicts of interest exist between and among employers, employees, candidates, and recruiters. For example, a job-seeking candidate working for Company A will not want his boss or the human resources department at Company A to know that he is seeking work elsewhere. Company A may be a subsidiary or affiliate of Company B and both companies may use a common recruiter or job-seeking platform. Using corporate structure information available from corporate information databases 113, knowledge of the candidate's job-seeking elsewhere may be shielded (e.g., via employment search privacy firewall 135) not only from Company A, but also Company B, and possible from the common recruiter or job-seeking platforms used by both companies. As another example, recruiter A and recruiter B may both have separate, non-exclusive contracts with candidate C for recruitment as well as having agreed to the terms of an external recruitment contract for a particular job opening with company D. If recruiter A and recruiter B both submit candidate C to company D, employment search privacy firewall 135 may flag a potential conflict for resolution by the human resources department of company D, wherein the human resources department must determine whether the fee for candidate C is payable to recruiter A only, recruiter B only, or subject to a fee-sharing arrangement as set forth in the external recruitment contract.

Compensation allocation layer 140 tracks and implements any recruiter to recruiter fee sharing established by recruiter to recruiter marketplace. Using the example described above of a fee-splitting or fee-sharing arrangement that could be implemented, assume that a recruiter A has a contract with candidate B, but no contacts with or knowledge of positions available at company C. Recruiter D often works with company C and has knowledge of a job opening for which candidate B might be suitable. AI-based social network extender 200 discovers that recruiter D has certain connections to candidate B through his extended social networks. Recruitment manager 131 may send an offer to recruiter A to share fees with recruiter D for a job opening for which candidate B may be suitable. If recruiter A accepts the offer, then candidate B will be sent to company C as a candidate for the open job position. If company C accepts candidate B, then compensation & sharing engine 141 receives the total fee for the filled job opening from company C and splits the fee between recruiter A and recruiter D according to the terms of the offer.

Figure 2:
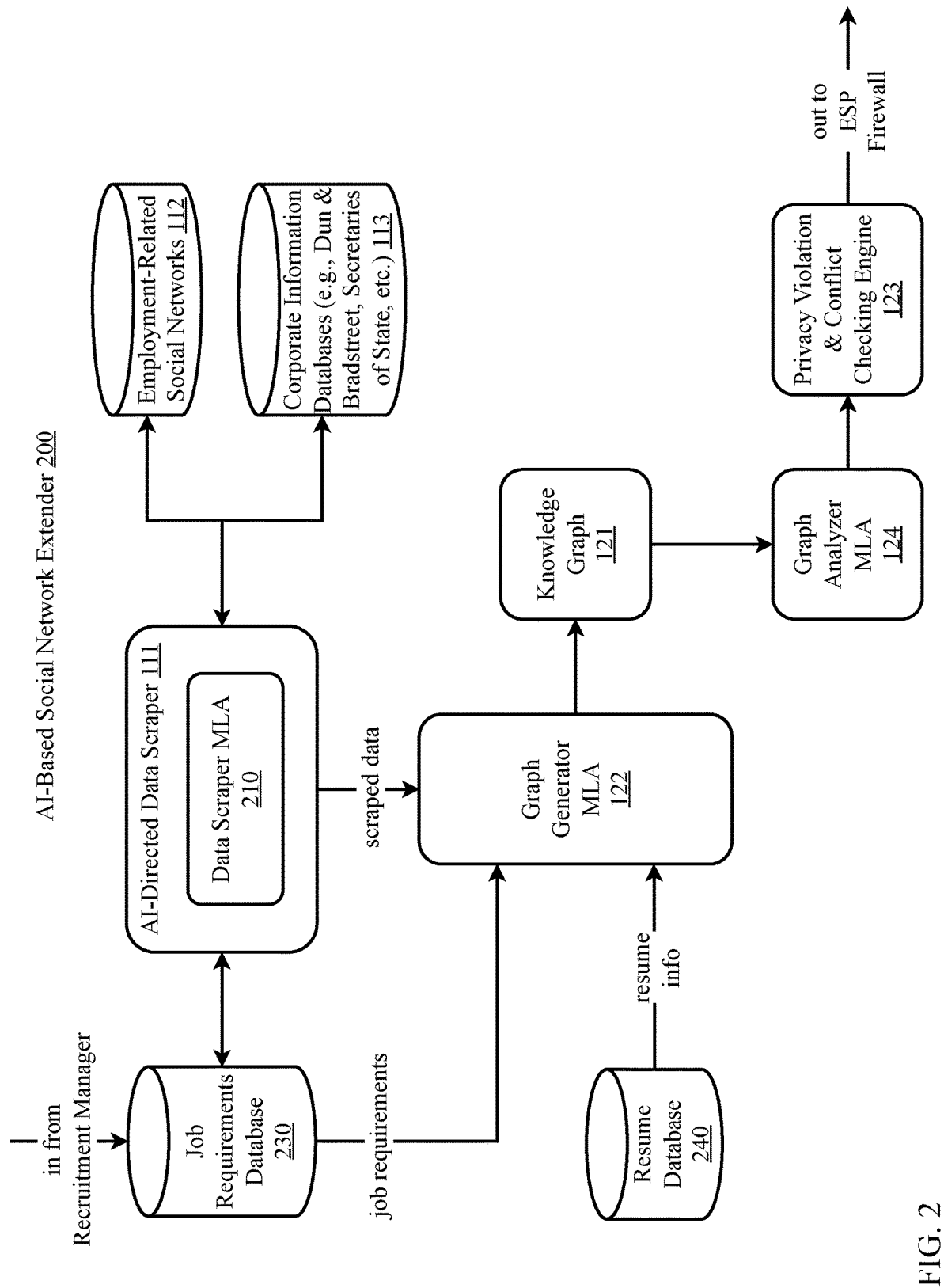
FIG. 2 is a block diagram illustrating an exemplary system architecture for an AI-based social network extender aspect of a system for AI-based employment social network extension.

FIG. 2 is a block diagram illustrating an exemplary system architecture for an AI-based social network extender aspect of a system for AI-based employment social network extension. The architecture for AI-based social network extender 200 can be conceived of as an arrangement of certain previously-described components plus additional components described below. The previously-described components are AI-directed data scraper 111 (which searches employment-related social networks 112 and corporate information databases 113 which, in this embodiment, are third party databases that are not components of the system described herein), knowledge graph 121, graph analyzer MLA 122, and privacy violation and conflict checking engine 123, each of which has the functionality previously described above. AI-based social network extender 200 further comprises the following additional components: a data scraper MLA 210, a graph analyzer MLA 124, a job requirements database 230, and a resume database 240.

Data scraper MLA 210 is a machine learning algorithm that has been trained to identify relationships between and among employees, recruiters, and their respective social networks in knowledge graph 121 which may contain useful information for a given job opening for purposes of directing AI-directed data scraper 111 to gather information for that job opening from relevant social networks of relevant employees and recruiters. Data scraper MLA's 210 directions to AI-directed data scraper 111 may be tailored to each job opening. So, requirements for a job opening may be fed into Data scraper MLA 210 from job requirements database 230 which has received its information from recruitment manager 131. Data scraper MLA 210 will search knowledge graph 121 for relevant social networks of relevant employees and recruiters and direct AI-directed data scraper 111 to follow certain paths within the relevant social networks to find information about suitable candidates. Data scraper MLA 210 may be trained to choose paths within relevant social networks based on relevance of information in those social networks to the job requirements for the job opening, as further described below in FIG. 3 and FIG. 4. Information gathered for each search may be placed in knowledge graph 121 which will avoid the need for crawling and scraping from those paths in the future for some period of time within which the scraped information is still considered valid and/or not stale.

Graph analyzer MLA 124 is a machine learning algorithm that has been trained to identify suitability of candidates for a given job opening based on information in knowledge graph 121 comprising scraped candidate information from AI-directed data scraper 111 and job requirements from job requirements database 230. Data scraper MLA 210 may be trained based on historical information regarding suitability of previously-placed candidates (both short term and long term) for certain job openings based on matches between candidate qualifications and the job requirements for those job openings.

Job requirements database 230 receives and stores job requirements received from recruiting manager 131 as generated by employer using either employer to employee module 132 or employer to external recruiter module 133.

Resume database 240 contains list of candidate and/or recruiter resumes either submitted directly by candidates, submitted through recruiters, or scraped from relevant social media networks by AI-directed data scraper 111.

Figure 3:
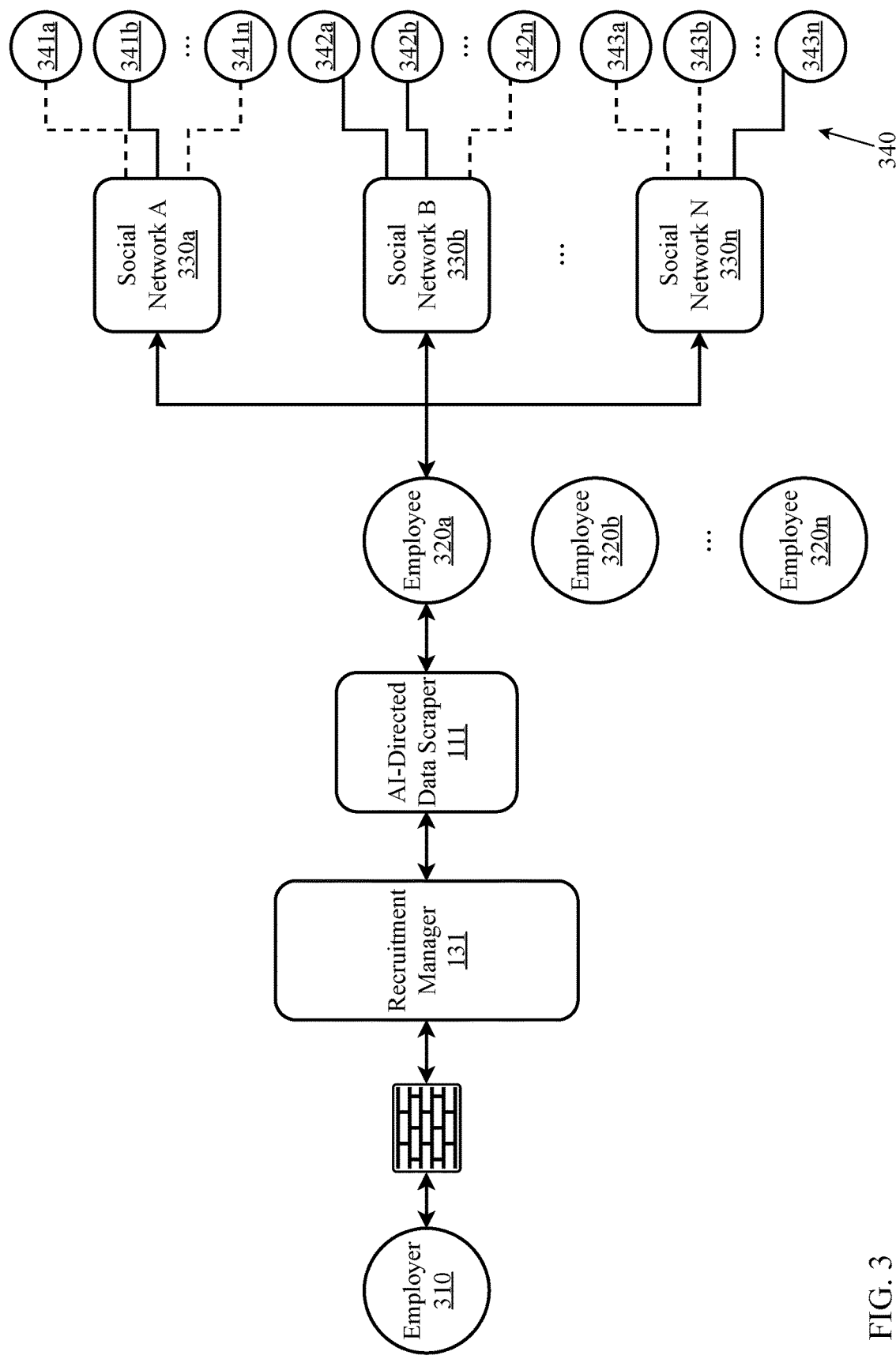
FIG. 3 is a flow diagram illustrating application of AI-based social network extension for finding suitable candidates internally via existing employees.

FIG. 3 is a flow diagram illustrating application of AI-based social network extension for finding suitable candidates internally via existing employees. Here, a process for targeted social network extension is shown wherein an employer 310 posts a job opening for internal recruiting using employee networks as described above, the job opening comprising job requirements. The job opening and its requirements are passed through a firewall which provides privacy and conflict protections as described above by limiting potentially sensitive information flowing back to employer. The job opening and its requirements are received by recruitment manager 131 which has functionality as previously-described above including, in at least one embodiment, direction of AI-directed data scraper via the process described in FIG. 2 (i.e., by providing the job requirements to job requirements database 230 which are ingested by data scraper MLA 210 which directs AI-directed data scraper 111 to perform targeted searching and scraping of employment related social networks 112 and corporate information databases 113). For each of one or more employees 320*a-n*, AI-directed data scraper 111 performs social network crawling and scraping as directed. Focusing on an example of a single employee 320*a*, AI-directed data scraper 111 identifies one or more social networks 330*a-n* for associated with employee 320*a* which may include both social networks for which employee 320*a* has granted access to his or her profile, and/or public portions of such social networks for which employee 320*a* has agreed to participate but for which he or she has not granted access to his or her profile. In this example, social network A 330*a* has several $1^{st}$ DSOCs 341*a-n* for employee 320*a*, one of which 341*b* (indicated by a solid line) may be a suitable candidate for the job opening posted by employer 310. Social network B 330*b* likewise has several $1^{st}$ DSOCs 342*a-n* for employee 320*a*, two of which 342*a, b* (indicated by solid lines) may be a suitable candidate for the job opening posted by employer 310. Social network N 330*n* likewise has several $1^{st}$ DSOCs 343*a-n* for employee 320*a*, one of which 343*n* (indicated by a solid line) may be a suitable candidate for the job opening posted by employer 310. AI-directed data scraper 111 scrapes the information for each identified potentially suitable candidate 341*b*, 342*a, b*, and 343*n*, to gather available information such as resumes, education, skills, and employment history, and stores the gathered information in knowledge graph 121 along with other relevant information such as the relationship of each candidate to the employee 320*a*, if known (e.g., colleagues at a prior company, social acquaintances, close friends, family members, etc.). The information stored in knowledge graph 121 is then used as described above to identify and select candidates to send to employer to possibly fill the job opening.

Figure 4:
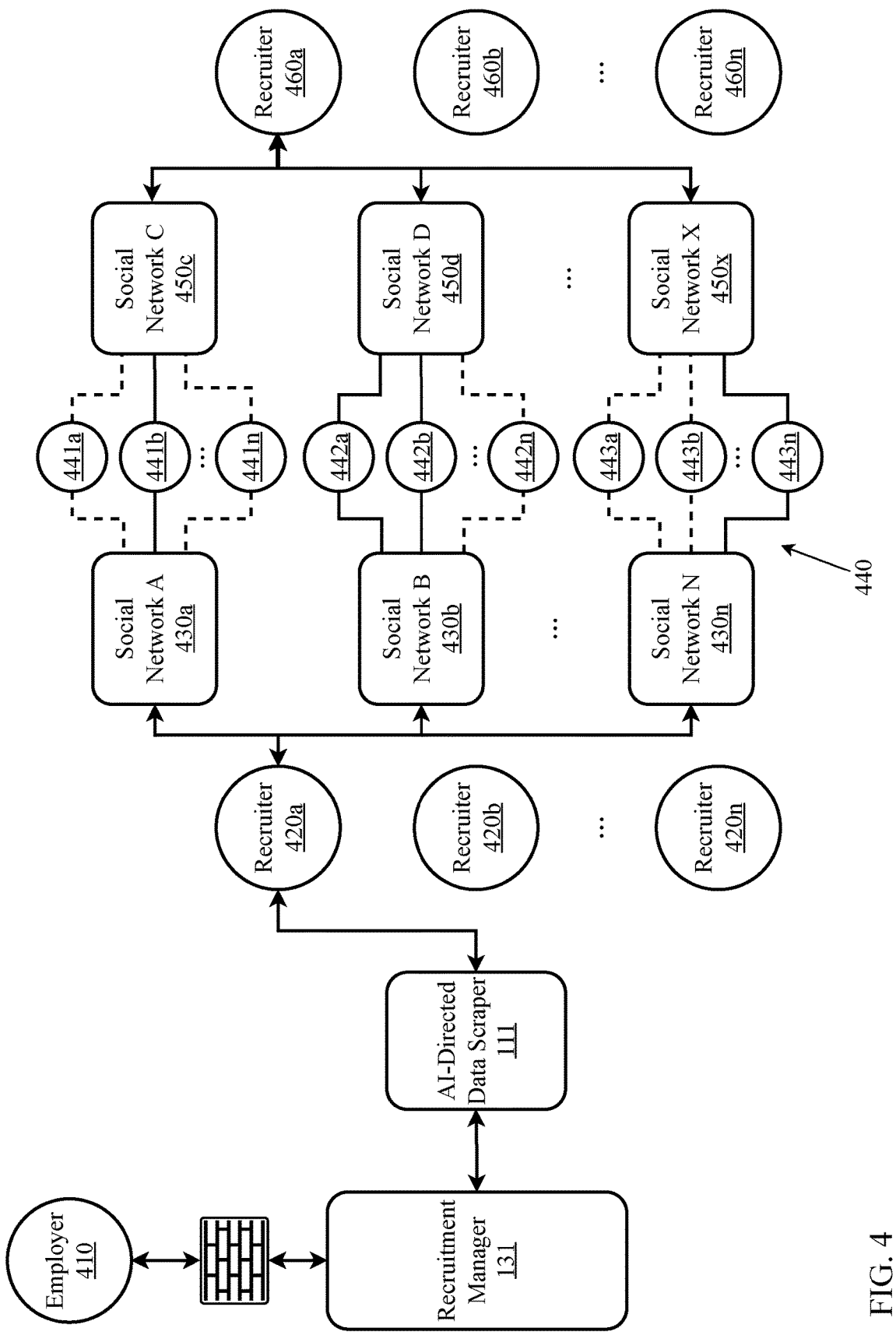
FIG. 4 is a flow diagram illustrating application of AI-based social network extension for finding suitable candidates externally via recruiters.

FIG. 4 is a flow diagram illustrating application of AI-based social network extension for finding suitable candidates externally via recruiters. There process shown here is similar to that described in FIG. 3 for employees, but with the extension of the social networks to other recruiters who may be connected to one another through common associations with one or more potential candidates. Here, a process for targeted social network extension is shown wherein an employer 410 posts a job opening for external recruiting using recruiter networks as described above, the job opening comprising job requirements. The job opening and its requirements are passed through a firewall which provides privacy and conflict protections as described above by limiting potentially sensitive information flowing back to employer. The job opening and its requirements are received by recruitment manager 131 which has functionality as previously-described above including, in at least one embodiment, direction of AI-directed data scraper via the process described in FIG. 2 (i.e., by providing the job requirements to job requirements database 230 which are ingested by data scraper MLA 210 which directs AI-directed data scraper 111 to perform targeted searching and scraping of employment related social networks 112 and corporate information databases 113). For each of one or more recruiters 420*a-n*, AI-directed data scraper 111 performs social network crawling and scraping as directed. Focusing on an example of a single recruiter 420*a*, AI-directed data scraper 111 identifies one or more social networks 430*a-n* associated with recruiter 420*a* which may include both social networks for which recruiter 420*a* has granted access to his or her profile, and/or public portions of such social networks for which recruiter 420*a* has agreed to participate but for which he or she has not granted access to his or her profile. In this example, social network A 430*a* has several $1^{st}$ DSOCs 441*a-n* for recruiter 420*a*, one of which 441*b* (indicated by a solid line) may be a suitable candidate for the job opening posted by employer 410. Social network B 430*b* likewise has several $1^{st}$ DSOCs 442*a-n* for employee 420*a*, two of which 442*a, b* (indicated by solid lines) may be suitable candidates for the job opening posted by employer 410. Social network N 430*n* likewise has several $1^{st}$ DSOCs 443*a-n* for recruiter 420*a*, one of which 443*n* (indicated by a solid line) may be a suitable candidate for the job opening posted by employer 410. AI-directed data scraper 111 scrapes the information for each identified potentially suitable candidate 441*b*, 442*a, b*, and 443*n*, to gather available information such as resumes, education, skills, and employment history, and stores the gathered information in knowledge graph 121 along with other relevant information such as the relationship of each candidate to the recruiter 420*a*, if known (e.g., colleagues at a prior company, social acquaintances, close friends, family members, etc.). The information stored in knowledge graph 121 is then used as described above to identify and select candidates to send to employer to possibly fill the job opening.

Further, however, another set of recruiters 460*a-n* may be connected to the first set of recruiters 420*a* through connections with some of the same candidates 441*a-n*, 442*a-n*, 443*a-n*, through a second set of social networks 450*c-x* (while shown here for clarity as two mutually-exclusive sets of social networks, first set of social networks 430*a-n* may, in fact, be the same as or have some overlap with second set of social networks 450c-x). Focusing on relationships between recruiter 420a and recruiter 460a as one example, these two recruiters have one potential candidate 441b as a common $1^{st}$ DSOC for each recruiter. Assume that recruiter 460a has a contract with candidate 441b, but no contacts with or knowledge of positions available at employer 410. Recruiter 420a often works with employer 410 and has knowledge of a job opening for which candidate 441b might be suitable. AI-based social network extender 200 discovers that recruiter 420a has certain connections to candidate 441b through his extended social networks. Recruitment manager 131 may send an offer to recruiter 460a to share fees with recruiter 420a for a job opening for which candidate 441b may be suitable. If recruiter 460a accepts the offer, then candidate 441b will be sent to employer 410 as a candidate for the open job position. If employer 410 accepts candidate 441, then compensation & sharing engine 141 receives the total fee for the filled job opening from employer 410 and splits the fee between recruiter 460a and recruiter 420a according to the terms of the offer.

Figure 5:
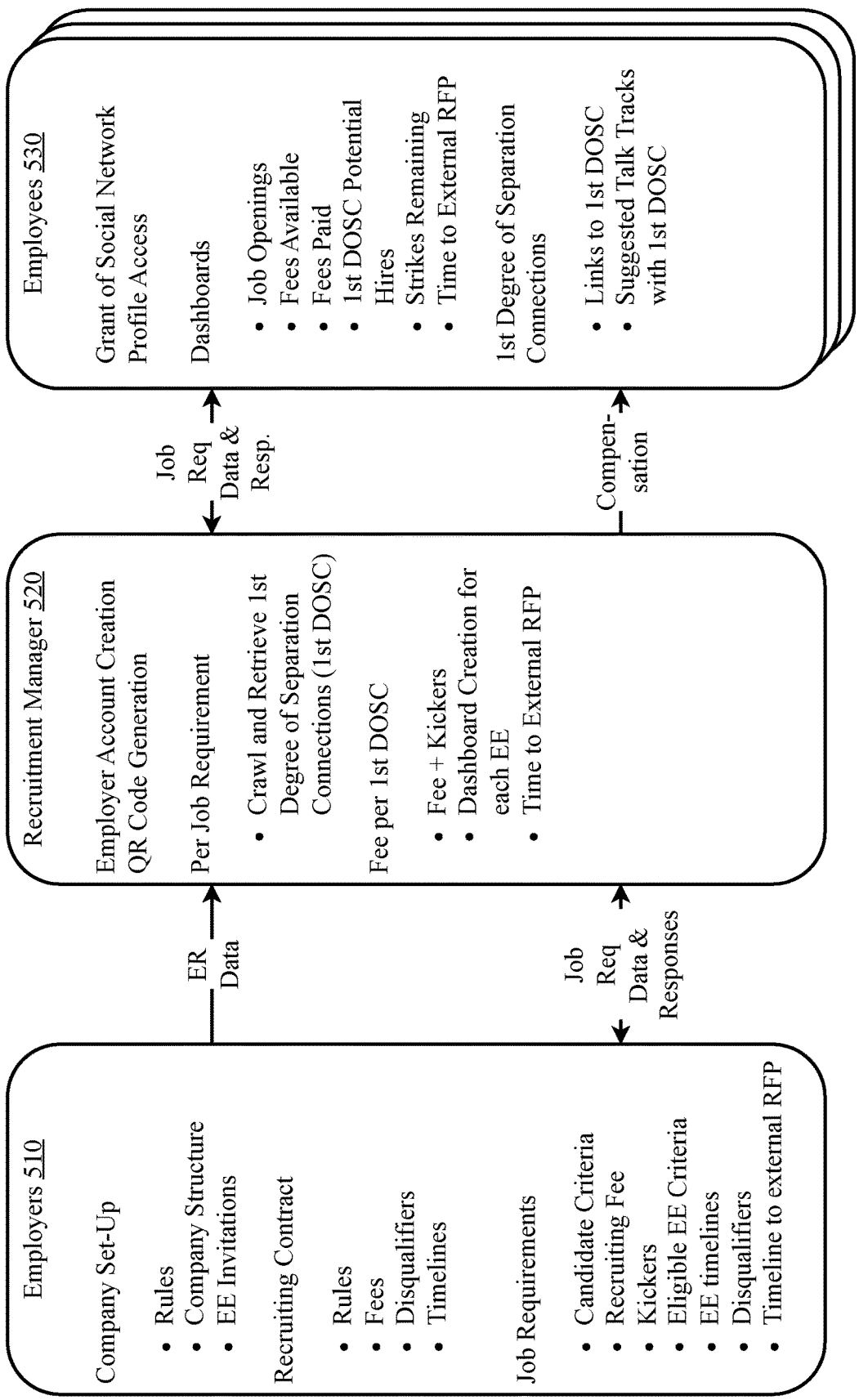
FIG. 5 is a flow diagram illustrating an internal referral process for finding suitable candidates internally via existing employees.

FIG. 5 is a flow diagram illustrating an internal referral process for finding suitable candidates internally via existing employees. Employer to employee module 132 provides employers with an interface at step 510 for setting up an employer company account including, but not limited to, establishing of rules for employee participation in internal recruiting efforts of the employer, description of the company's corporate structure (e.g., for internal allocation of job postings among subsidiaries or corporate affiliates), and sending invitations to employees to participate in internal recruiting efforts. Employer to employee module 132 further provides employers with an interface at step 510 for setting up recruiting contracts for available job openings (or groups of job openings) including, but not limited to, establishment of rules for a given job opening, establishment of fees to be paid for fulfillment of a given job opening establishment of disqualifiers for participation or receipt of fees (e.g., fraud, acting as an external recruiter by soliciting candidates from outside of the employee's social networks, etc.), and establishment of a timeline for transfer of the internal recruitment effort using employee networks to an external recruitment effort using recruiters. Employer to employee module 132 further provides employers with an interface at step 510 for establishment of job requirements for job openings including, but not limited to, candidate criteria, recruiting fees, fee kickers and additional incentives, eligible employee criteria, timelines or deadlines for employees to accept participation in a given job opening, disqualifiers, and a timeline or deadline for transfer of the internal recruitment effort using employee networks to an external recruitment effort using recruiters employer to external recruiter module 133.

Recruitment manager 131 at step 520 coordinates the engagement and interactions between employers, employees, and recruiters, directs AI-directed data scraper to gather information from employment-related social networks and corporate information databases, manages transfer of recruiting contracts from an internal search via employee networks to an external search via recruiters at a time determined by employer when each recruiting contract is set up for each job opening, tracks submission of candidate applications for job openings, and makes payments for candidates accepted for job openings. Recruitment manager 131 at step 520 further creates accounts based on company setup information provided at step 510, and generates QR codes for distribution to employees for participation in internal recruitment for a given job opening. Recruitment manager 131 at step 520 further creates or populates dashboards for participating employees, tracks the time remaining until transfer of the recruitment process for a given job opening to external recruiting, and makes payment of compensation for any accepted candidates.

Employer to employee module 132 provides employees wishing to participate in internal recruitment efforts an interface at step 530 for granting the AI-directed data scraper 111 access to their social network profiles for gathering of information about potential candidates (including, but not limited to, first degree of separation connections ($1^{st}$ DOSCs)). Employer to employee module 132 further provides participating employees an interface at step 530 for dashboards for managing their internal recruitment participation including, but no limited to, providing information about available job openings, fees available, fees paid, lists of their first degree of separation connections ($1^{st}$ DOSCs) eligible for certain job openings, strikes remaining (i.e., rule violations or other participation failures associated with an employee's participation in internal recruiting efforts including, but not limited to, instances in which an accepted candidate is fired or rejected within a defined trial or probationary period), and the time remaining until a given job opening is transferred from an internal recruitment effort using employee networks to an external recruitment effort using recruiters.

Recruitment manager 131 coordinates the engagement and interactions between employers, employees, and recruiters, directs AI-directed data scraper to gather information from employment-related social networks and corporate information databases, manages transfer of recruiting contracts from an internal search via employee networks to an external search via recruiters at a time determined by employer when each recruiting contract is set up for each job opening, tracks submission of candidate applications for job openings, and makes payments for candidates accepted for job openings.

Figure 6:
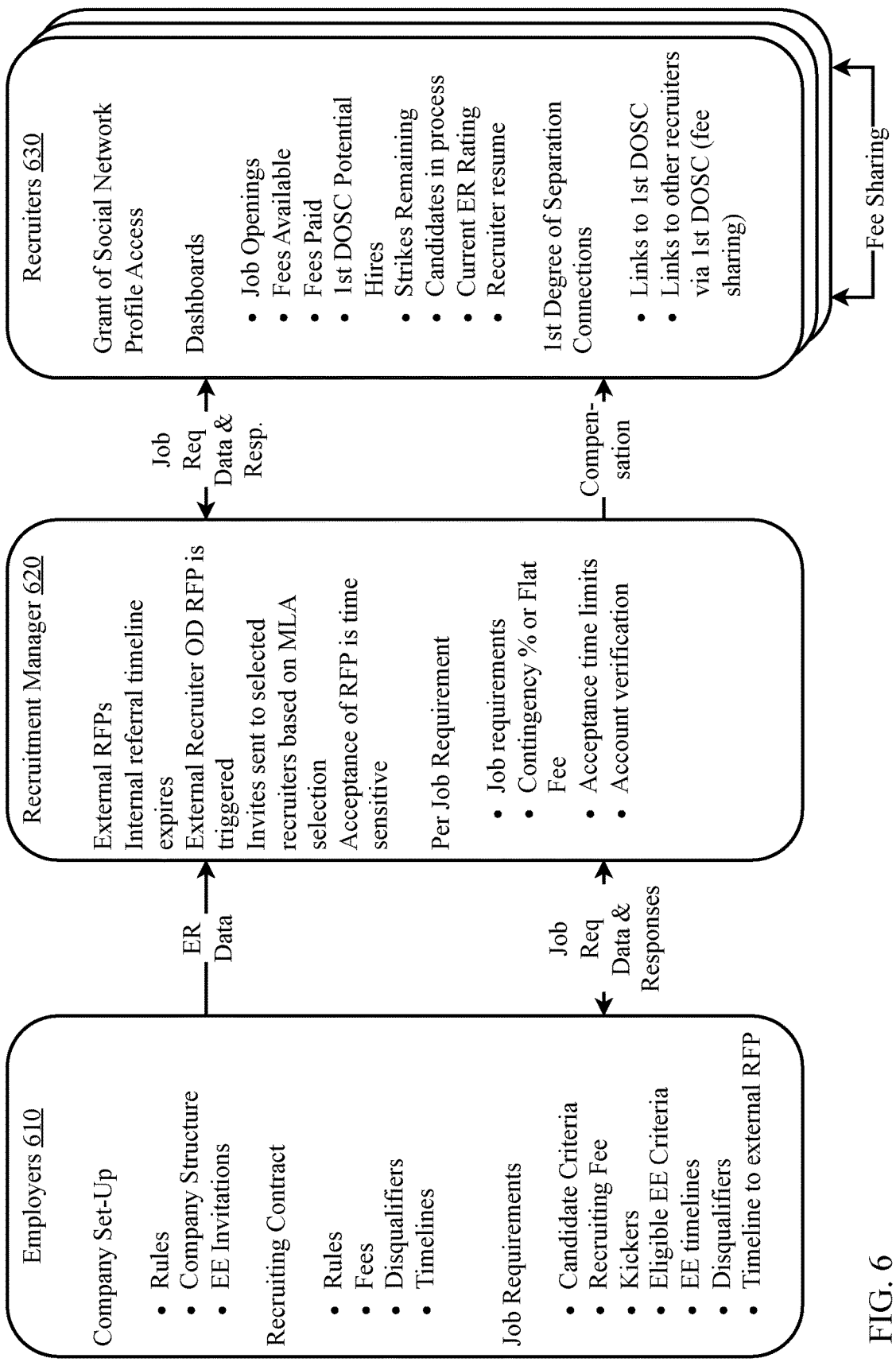
FIG. 6 is a flow diagram illustrating an external referral process for finding suitable candidates internally via existing employees.

FIG. 6 is a flow diagram illustrating an external referral process for finding suitable candidates internally via existing employees. Employer to external recruiter module 133 provides employers with an interface at step 610 for setting up an employer company account including, but not limited to, establishing of rules for recruiter participation in external recruiting efforts of the employer, description of the company's corporate structure (e.g., for external allocation of job postings among subsidiaries or corporate affiliates), and sending invitations to recruiters to participate in external recruiting efforts. Employer to external recruiter module 133 further provides employers with an interface at step 610 for setting up recruiting contracts for available job openings (or groups of job openings) including, but not limited to, establishment of rules for a given job opening, establishment of fees to be paid for fulfillment of a given job opening establishment of disqualifiers for participation or receipt of fees (e.g., fraud, unauthorized fee sharing with recruiters who have not accepted the terms of participation in the employer's external recruiting process, etc.), and establishment of a timeline for transfer of the internal recruitment effort using employee networks to an external recruitment effort using recruiters. Employer to external recruiter module 133 further provides employers with an interface at step 610 for establishment of job requirements for job openings including, but not limited to, candidate criteria, recruiting fees, fee kickers and additional incentives, eligible recruiter criteria, timelines or deadlines for recruiters to accept participation in a given job opening, disqualifiers, and a timeline or deadline for transfer of the internal recruitment effort using employee networks to an external recruitment effort using recruiters employer to external recruiter module 133.

Recruitment manager 131 at step 620 coordinates the engagement and interactions between employers, employees, and recruiters, directs AI-directed data scraper to gather information from employment-related social networks and corporate information databases, manages transfer of recruiting contracts from an internal search via employee networks to an external search via recruiters at a time determined by employer when each recruiting contract is set up for each job opening, tracks submission of candidate applications for job openings, and makes payments for candidates accepted for job openings. Recruitment manager 131 at step 620 further creates accounts based on company setup information provided at step 610, and creates and distributes external requests for proposals to recruiters for job openings when the timeline (or deadline) for internal recruitment efforts expires, and manages acceptance by recruiters of requests for proposals (RFPs) for recruiting for job openings. Recruitment manager 131 at step 620 further notifies participating recruiters or the per job requirements including such things as job requirements, percentage contingency fee or flat fee, RFP acceptance time limits, and verification of recruiter accounts.

Employer to external recruiter module 133 provides recruiters wishing to participate in external recruitment efforts an interface at step 630 for granting the AI-directed data scraper 111 access to their social network profiles for gathering of information about potential candidates (including, but not limited to, first degree of separation connections (1$^{st}$ DOSCs)). Employer to external recruiter module 133 further provides participating recruiters an interface at step 630 for dashboards for managing their external recruitment participation including, but no limited to, providing information about available job openings, fees available, fees paid, lists of their first degree of separation connections (1$^{st}$ DOSCs) eligible for certain job openings, strikes remaining (i.e., rule violations or other participation failures associated with an recruiter's participation in external recruiting efforts including, but not limited to, instances in which an accepted candidate is fired or rejected within a defined trial or probationary period), lists of candidates submitted for consideration who are in process for evaluation by employer, a current rating of the recruiter by the employer (or vice-versa), a copy of the recruiter's resume and/or history of placements, and a list of recruiter to recruiter links through potential candidates identified through each recruiter's extended social network.

Figure 7:
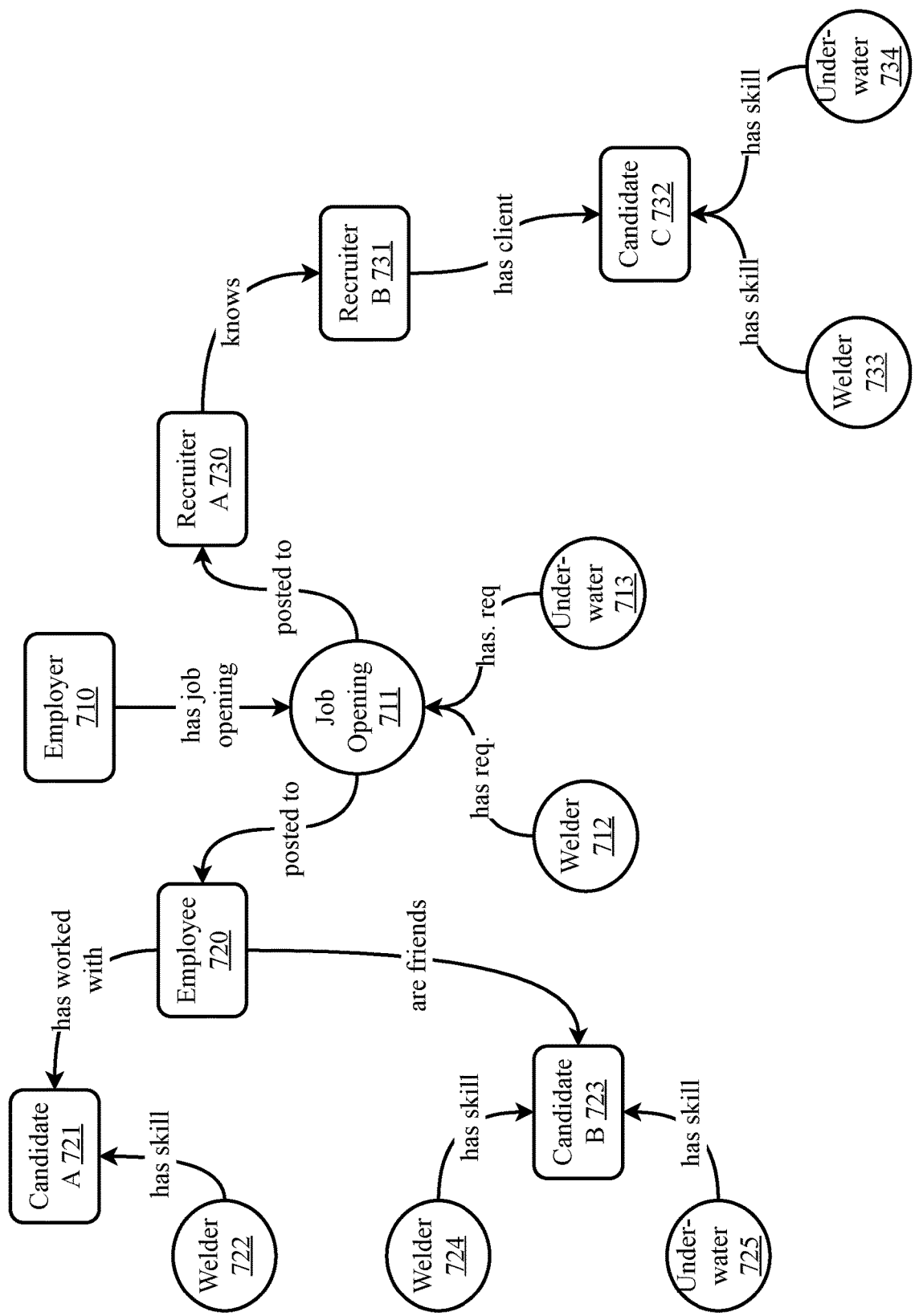
FIG. 7 is a diagram illustrating an exemplary knowledge graph for use in maximizing candidate suitability for a given job opening.

FIG. 7 is a diagram illustrating an exemplary knowledge graph for use in maximizing candidate suitability for a given job opening. A knowledge graph represents all information gathered as a complex web of nodes and edges, wherein the nodes of represent entities, objects, events, situations, or concepts, and the edges represent relationships between the nodes. Edges of a knowledge graph are usually directed (i.e., having direction, as in a directed graph) and may be labeled or weighted to represent a type or strength of relationship. The exemplary knowledge graph shown here comprises nodes for persons (employer 710, employee 720, recruiters 730, 731, and candidate 732), a job opening 711, and skills (e.g., welder 712 and underwater welding 713). The labeled edges (shown as arrows) indicate relationships between the nodes. Knowledge graphs may be generated and analyzed by an AI-based graph generator/analyzer, which is a machine learning algorithm that has been trained to identify types of nodes and classify complex relationships between the nodes, thus placing the nodes within a schematic context and drawing edges between the nodes representing relationships among them that have been determined by the machine learning algorithm through its training. The AI-based graph generator/analyzer classifies information received for the knowledge graph and adds appropriate nodes and edges for the information to the knowledge graph based on the schematic context of the information as determined by its machine learning algorithm. Queries may be sent to the AI-based graph generator/analyzer for generation of a relevant response based on the information contained in the knowledge graph. For example, a job opening with its requirements may be fed into the AI-based graph generator/analyzer, which will search the knowledge graph for a suitable candidate based on all information available such as candidate qualifications, location, relationships with employers, employees, and other candidates, and other information gathered as described above.

Here, an employer 710 has a job opening 711 with two skill requirements, welding skill 712 and further underwater welding skill 713. The job opening has been posted to an employee 720 for internal recruiting. Extended social network crawling and scraping has gathered information that employee 720 has connections with two possible candidates, candidate A 721 with whom employee 720 has worked in the past and candidate B 723 who is a friend of employee 720. Candidate A 721 has the required welding skill 722 but no underwater welding skill, so is not a suitable candidate. candidate B 723 has the required welding skill 722 and the required underwater welding skill 725, so is a suitable candidate. If the time expires for internal recruiting for the job opening, the job opening is the posted to recruiter A 730 who does not have a candidate available, but whose extended social networks indicate knows recruiter B 731 who has candidate C 732 as a client. Candidate C 732 has the required welding skill 722 and the required underwater welding skill 725, so is a suitable candidate. If candidate C is hired for the job opening, because he was found through a network of recruiters (in this case two recruiters), the recruiting fee would be split between recruiter A 730 and recruiter B 731 according to the allocation of compensation procedures set forth above.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 8:
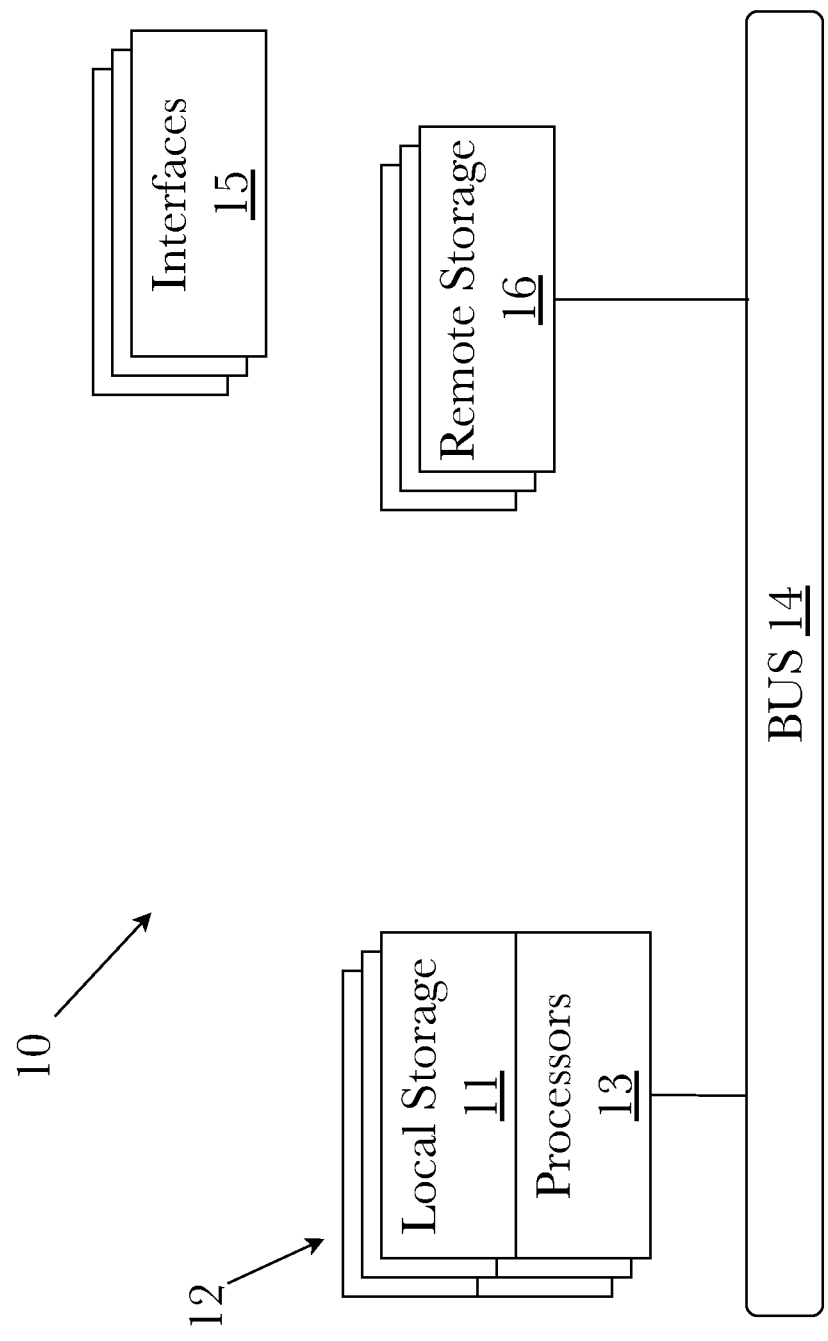
FIG. 8 is a block diagram illustrating an exemplary hardware architecture of a computing device.

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™ THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 9:
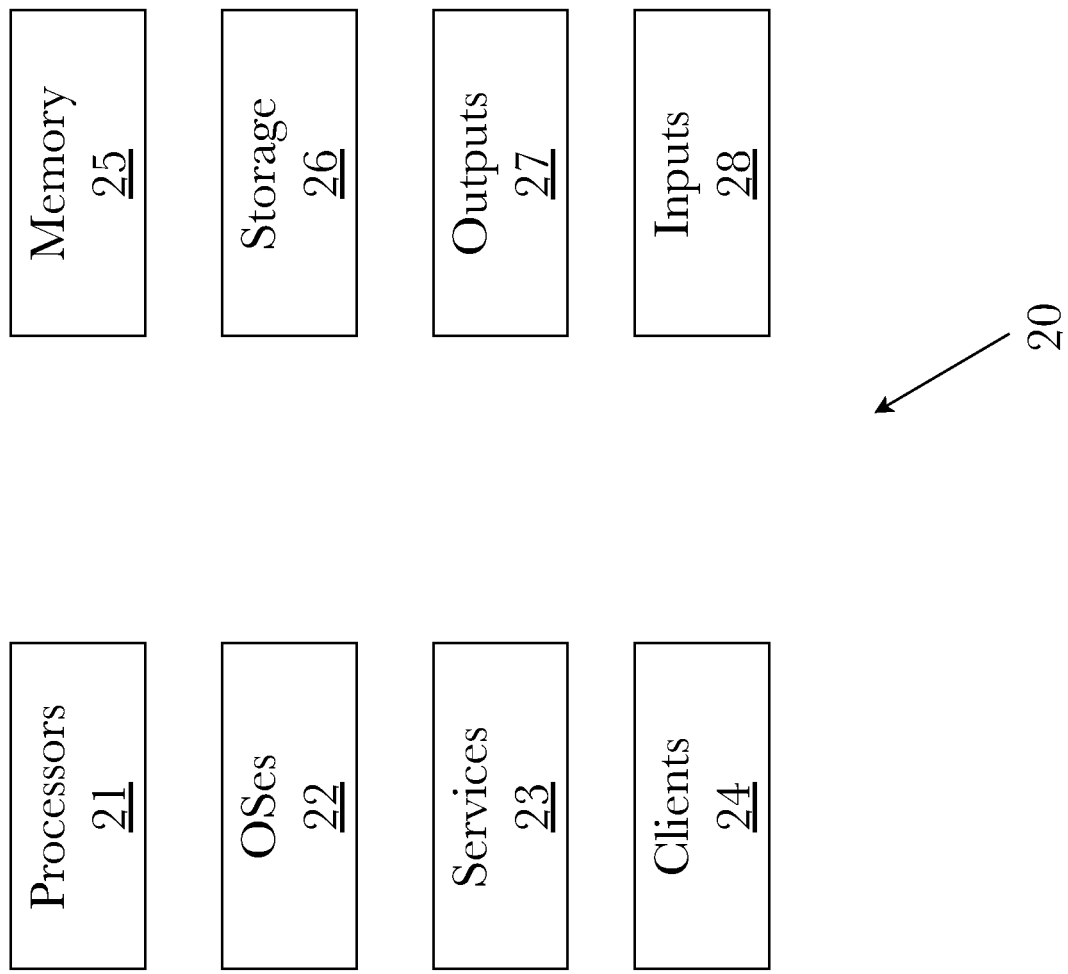
FIG. 9 is a block diagram illustrating an exemplary logical architecture for a client device.

In some aspects, systems may be implemented on a standalone computing system. Referring now to FIG. 9, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

Figure 10:
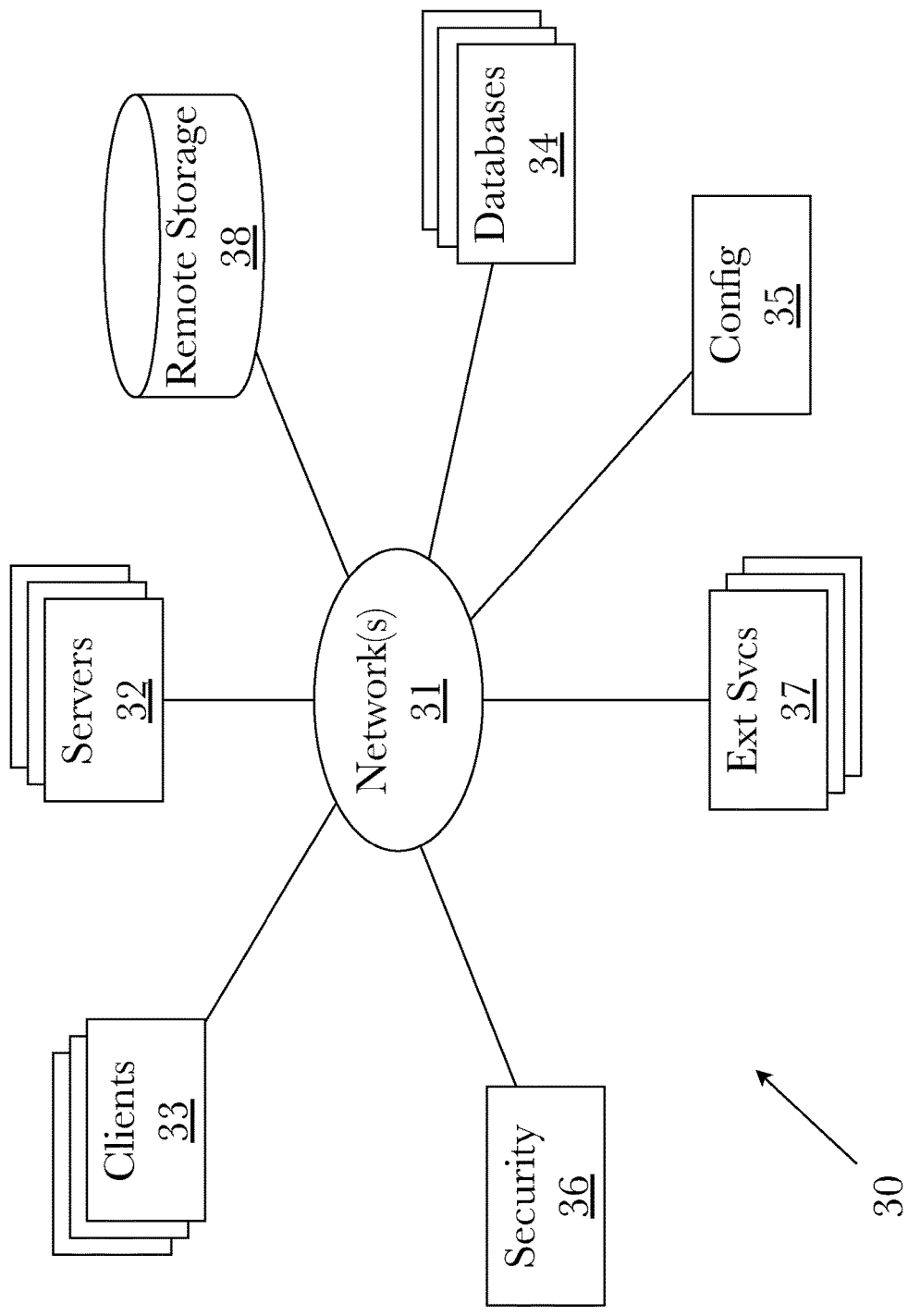
FIG. 10 is a block diagram showing an exemplary architectural arrangement of clients, servers, and external services.

In some aspects, systems may be implemented on a distributed computing network, such as one having any number of clients and/or servers. Referring now to FIG. 10, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 9. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 11:
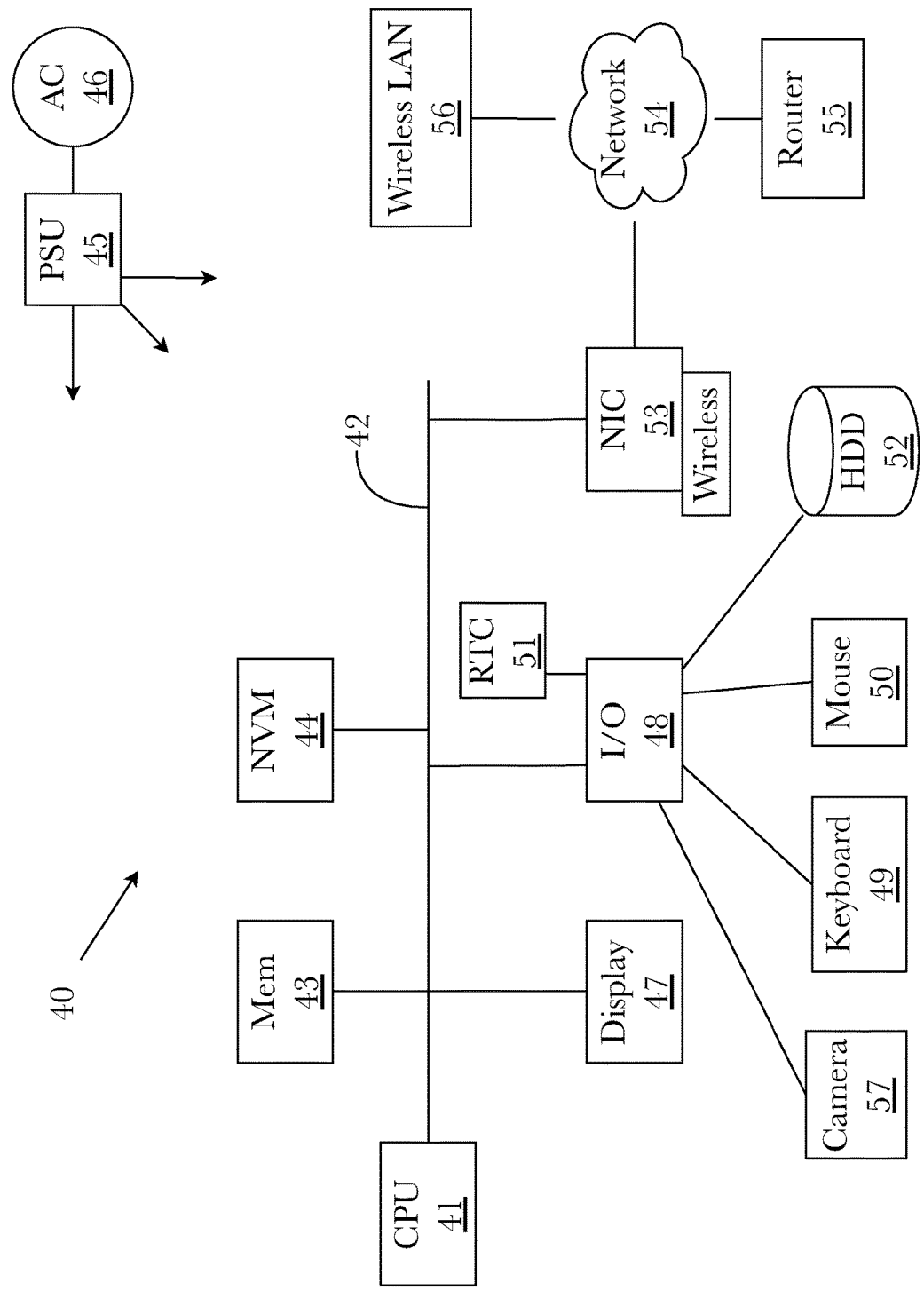
FIG. 11 is another block diagram illustrating an exemplary hardware architecture of a computing device.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:
1. A system for social network extension for recruiting for job openings, comprising:
  a computing device comprising a memory and a processor;
  a first machine learning algorithm operating on the computing device, the first machine learning algorithm having been trained to identify information on social media networks and databases relevant to job openings;
  a second machine learning algorithm operating on the computing device, the second machine learning algorithm having been trained to generate a knowledge graph comprising information relevant to selection of candidates for job openings;
  a third machine learning algorithm operating on the computing device, the third machine learning algorithm having been trained to analyze the knowledge graph to identify a best fit between job openings and candidates for job openings;
  a recruitment manager comprising a first plurality of programming instructions stored in the memory which, when operating on the processor, causes the computing device to:
    receive a job opening from an employer, the job opening comprising job requirements;
    send the job opening to an artificial-intelligence-directed (AI-directed) data scraper;
    receive candidate information from the AI-directed data scraper relevant to the job opening;
    send the job opening and candidate information to an artificial-intelligence-based (AI-based) knowledge graph generator;
    request a candidate selection from an artificial-intelligence-based (AI-based) graph analyzer;
    receive the candidate selection and send it to the employer;
  the AI-directed data scraper comprising a second plurality of programming instructions stored in the memory which, when operating on the processor, causes the computing device to:
    receive the job opening;
    process the job requirements of the job opening through the first machine learning algorithm to obtain scraping instructions;
    scrape candidate data for one or more candidates from one or more employment-related social networks of an employee or of an external recruiter according to the scraping instructions; and
    return the candidate information to the recruitment manager;
  the AI-based knowledge graph generator comprising a third plurality of programming instructions stored in the memory which, when operating on the processor, causes the computing device to:
    receive the job opening and candidate information; and
    process the job opening and candidate information through the second machine learning algorithm to generate a knowledge graph comprising nodes representing data components comprising the job requirements and the candidate information, and edges representing relationships between the data components;
  the AI-based knowledge graph analyzer comprising a fourth plurality of programming instructions stored in the memory which, when operating on the processor, causes the computing device to:
    receive the request for the candidate selection;
    process the request through the third machine learning algorithm to make the candidate selection; and
    return the candidate selection to the recruitment manager;

wherein the job opening further comprises company information; and the AI-directed data scraper is further configured to:
   process the job requirements of the job opening through the first machine learning algorithm to obtain scraping instructions; and
   scrape company information from one or more corporate information databases according to the scraping instructions;
a privacy violation and conflict checking engine comprising a fifth plurality of programming instructions stored in the memory which, when operating on the processor, causes the computing device to:
   determine whether any conflicts of interest exist between and among the employer, the employee, the recruiter, and the one or more candidates; and
   mask sensitive information of the one or more candidates from the employer;
wherein the recruitment manager first limits the AI-directed data scraper to operate only on social networks of employees of the employer and then, after a pre-defined period of time, instructs the AI-directed data scraper to operate only on social networks of external recruiters.

2. The system of claim 1, further comprising a recruiter to recruiter marketplace comprising a sixth plurality of programming instructions stored in the memory which, when operating on the processor, causes the computing device to, after the pre-defined period of time: identify situations wherein the candidate selection is a candidate found as a connection of a first recruiter, but who is a client of, or under contract to, a second recruiter; send an offer to the second recruiter to split a recruiting fee for the candidate selection with the first recruiter, the offer comprising a split percentage or a split amount; receive an acceptance of the offer from the second recruiter; and upon acceptance by the employer of the candidate selection for the job opening, send portions of the recruiting fee to the first recruiter and second recruiter according to the split percentage or split amount.

3. A method for social network extension for recruiting for job openings, comprising the steps of:
   training a first machine learning algorithm operating on a computing device comprising a memory and a processor to identify information on social media networks and databases relevant to job openings;
   training a second machine learning algorithm operating on the computing device to generate a knowledge graph comprising information relevant to selection of candidates for job openings;
   training a third machine learning algorithm operating on the computing device to analyze the knowledge graph to identify a best fit between job openings and candidates for job openings;
   executing a recruitment manager operating on the computing device to:
      receive a job opening from an employer, the job opening comprising job requirements;
      send the job opening to an artificial-intelligence-directed (AI-directed) data scraper;
      receive candidate information from the AI-directed data scraper relevant to the job opening;
      send the job opening and candidate information to an artificial-intelligence-based (AI-based) knowledge graph generator;
      request a candidate selection from an artificial-intelligence-based (AI-based) graph analyzer;
      receive the candidate selection and send it to the employer;
   executing the AI-directed data scraper operating on the computing device to:
      receive the job opening;
      process the job requirements of the job opening through the first machine learning algorithm to obtain scraping instructions;
      scrape candidate data for one or more candidates from one or more employment-related social networks of an employee or of an external recruiter according to the scraping instructions; and
      return the candidate information to the recruitment manager;
   executing the AI-based knowledge graph generator operating on the computing device to:
      receive the job opening and candidate information; and
      process the job opening and candidate information through the second machine learning algorithm to generate a knowledge graph comprising nodes representing data components comprising the job requirements and the candidate information, and edges representing relationships between the data components;
   executing the AI-based knowledge graph analyzer operating on the computing device to:
      receive the request for the candidate selection;
      process the request through the third machine learning algorithm to make the candidate selection; and
      return the candidate selection to the recruitment manager;
   wherein the job opening further comprises company information; and the AI-directed data scraper is further used to:
      process the job requirements of the job opening through the first machine learning algorithm to obtain scraping instructions; and
      scrape company information from one or more corporate information databases according to the scraping instructions;
   executing a privacy violation and conflict checking engine operating on the computing device to: determine whether any conflicts of interest exist between and among the employer, the employee, the recruiter, and the one or more candidates; and mask sensitive information of the one or more candidates from the employer; and
   wherein the recruitment manager first limits the AI-directed data scraper to operate only on social networks of employees of the employer and then, after a pre-defined period of time, instructs the AI-directed data scraper to operate only on social networks of external recruiters.

4. The method of claim 3, further comprising the step of using a recruiter to recruiter marketplace operating on the computing device to, after the pre-defined period of time: identify situations wherein the candidate selection is a candidate found as a connection of a first recruiter, but who is a client of, or under contract to, a second recruiter; send an offer to the second recruiter to split a recruiting fee for the candidate selection with the first recruiter, the offer comprising a split percentage or a split amount; receive an acceptance of the offer from the second recruiter; and upon acceptance by the employer of the candidate selection for the job opening, send portions of the recruiting fee to the first recruiter and second recruiter according to the split percentage or split amount.

* * * * *